United States Patent [19]

Nagahiro et al.

[11] 3,758,009

[45] Sept. 11, 1973

[54] MAGNETIC RECORDING AND REPRODUCTING APPARATUS

[75] Inventors: Michinori Magahiro, Mishinomiya; Toshiomi Yabu, Kyoto; Hiroo Hosono, Hirakata; Masaharu Ushihara, Katano, all of Japan

[73] Assignee: Matsushita Electric Industrial Co., Ltd., Osaka, Japan

[22] Filed: Oct. 12, 1972

[21] Appl. No.: 297,073

[30] Foreign Application Priority Data

Oct. 15, 1971 Japan .............................. 46/81996

[52] U.S. Cl. ...................... 226/11, 226/91, 242/195, 226/43

[51] Int. Cl. ............................................ B65h 25/10

[58] Field of Search .................. 226/11, 43, 45, 91, 226/92; 250/219 FR, 219 DR; 242/188, 195; 340/259

[56] References Cited

UNITED STATES PATENTS

| | | | |
|---|---|---|---|
| 3,630,468 | 12/1971 | Christoffersen | 242/195 |
| 3,257,515 | 6/1966 | Nakamatso | 226/43 X |
| 3,197,150 | 7/1965 | Camras | 242/195 X |
| 2,971,716 | 2/1961 | Sampson | 250/219 FR X |

*Primary Examiner*—Allen N. Knowles
*Assistant Examiner*—Gene A. Church
*Attorney*—Richard K. Stevens et al.

[57] ABSTRACT

A video tape recorder of the one reel cartridge type using a magnetic tape having a transparent leader tape and a transparent trailer tape connected to the leading and trailing ends thereof respectively. A transparent tape portion detector is disposed adjacent to the tape path for detecting misloading of the leader tape portion so that the magnetic tape can be automatically stopped or rewound in the event of misloading.

7 Claims, 5 Drawing Figures

MAGNETIC RECORDING AND REPRODUCTING APPARATUS

This invention relates to a magnetic picture recording and reproducing apparatus (hereinafter to be referred to as a VTR) or EVR of the one reel cartridge type, and more particularly to a tape drive control system of the automatic tape loading type in which a magnetic tape supplied from a supply reel is automatically taken up on a tape-up reel.

It has been the greatest defect of recorders such as a one reel cartridge type of VTR that the leader tape connected to the leading end of a magnetic tape supplied from the supply reel in the cartridge tends to be blocked at the cartridge outlet or in the leader tape passage and the leader tape and succeeding magnetic tape cannot be reliably taken up on the take-up reel with the result that the leader tape, magnetic tape and recorder are frequently damaged.

It is an object of the present invention to provide a leader tape misloading detecting system for use in a one reel cartridge type of VTR or the like, which can automatically return the leader tape portion back into the cartridge for preventing the damage above described in the event of misloading of the leader tape, thereby obviating the above-mentioned defect of the one reel cartridge type of VTR or the like.

Another object of the present invention is to provide an inexpensive misloading detecting system in which tape trailing end detecting means provided for detecting the trailing end of a magnetic tape in a one reel cartridge type of VTR is utilized for the detection of misloading of the leader tape.

According to the present invention, tape trailing end detecting means including a photo sensor for detecting a transparent trailer tape portion connected to the trailing end of a magnetic tape is utilized for the detection of misloading of the leader tape and the photo sensor is adapted to operate with a predetermined delay time which is sufficiently long for attaining the complete loading of the leader tape on the take-up reel so as to detect occurrence of undesirable misloading depending on the presence or absence of the magnetic tape portion in the tape path at that time.

Other objects, features and advantages of the present invention will be apparent from the following detailed description taken in conjunction with the accompanying drawing, in which.

Figure 1:
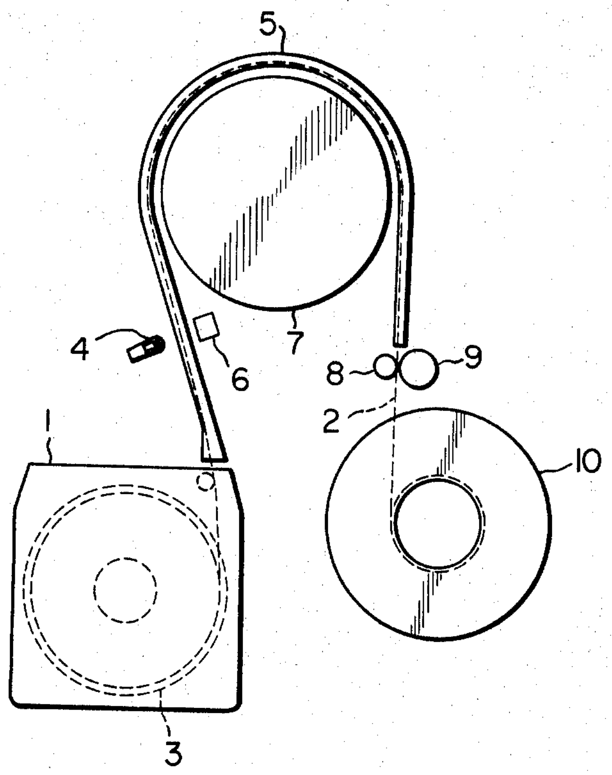
FIG. 1 is a diagrammatic plan view showing the path of a magnetic tape in a VTR provided with means embodying the present invention.
Figure 3:
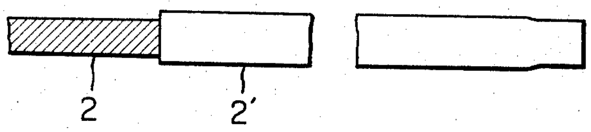
FIG. 3 is a schematic view showing a leader tape connected to the leading end of a magnetic tape preferably employed in the present invention.
Figure 5:
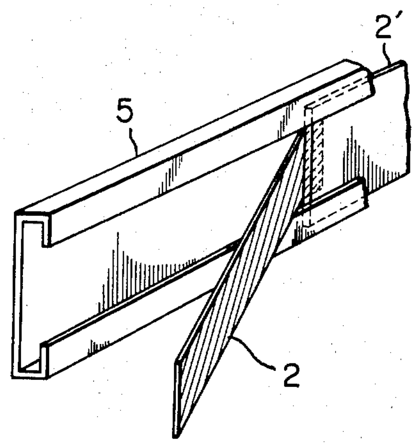
FIG. 5 is a schematic perspective view showing the state in which the leader tape portion shown in FIG. 3 is guided through a leader tape guide means.

Referring to FIG. 1 showing diagrammatically a tape path arrangement in a VTR provided with a control system according to the present invention, a cartridge 1 includes therein a supply reel 3, and an opaque magnetic tape 2 is wound around the supply reel 3. A transparent leader tape 2' which is rigider than the magnetic tape 2 is connected to the leading end of the magnetic tape 2 as shown in FIG. 3. A lamp 4 and a photoelectric element 6 are disposed opposite to each other on opposite sides of a tape traveling path or guide means 5 and the photoelectric element 6 produces a predetermined signal when the opaque magnetic tape 2 is not present between it and the lamp 4. The leader tape 2' connected to the leading end of the magnetic tape 2 supplied from the supply reel 3 in the cartridge 1 is guided along the tape traveling path or guide means 5 toward a take-up reel 10 and is engaged with the take-up reel 10 by known means to be taken up on the take-up reel 10. The succeeding magnetic tape 2 is driven by a capstan 8 and a pinch roller 9 and a video signal is recorded on or reproduced from the magnetic tape 2 by a video head unit 7. The tape guide means 5 acts to guide solely the leader tape 2', and the magnetic tape 2 is deflected inwardly during its traveling movement so as to engage the video head unit 7 as seen in FIG. 5.

Figure 2:
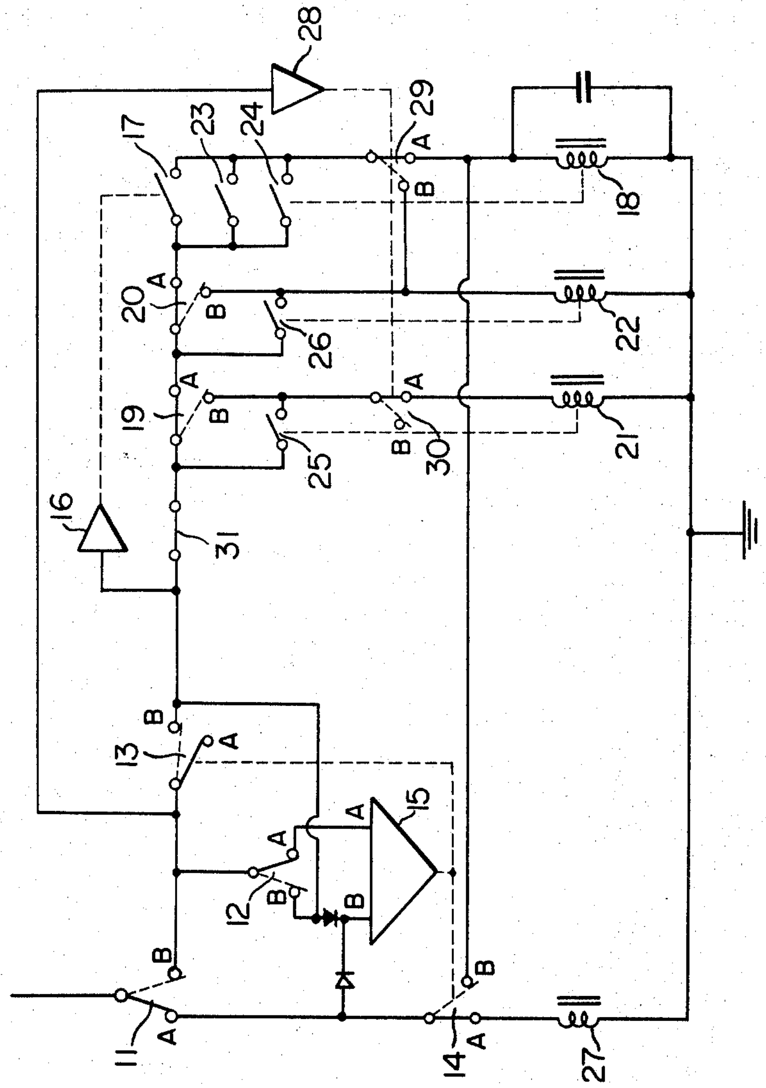
FIG. 2 is a circuit diagram of a system preferably employed in the present invention for controlling the traveling movement of the magnetic tape in the VTR shown in FIG. 1.

FIG. 2 is a circuit diagram of the control system according to the present invention for controlling the traveling movement of the magnetic tape 2. A two-way switch 11 is changed over from the position B to the position A when the cartridge 1 is mounted in position in the VTR, and this switch 11 is maintained in the position A. However, when a solenoid 18 described later is energized during reproduction, the switch 11 is changed over from the position A to the position B and is maintained in such position. Another switch 12 similar to the switch 11 is provided for detecting that the rewinding in operation is almost completed and is arranged for interlocking operation with a rotary member (not shown) which rotates in synchronism with the supply reel 3. This switch 12 is immediately changed over from the position A to the position B as soon as the supply reel 3 rotates in the tape forwarding direction and starts to forward the leader tape 2'. The switch 12 is changed over from the position B to the position A again upon completion of the rewinding operation. A delay relay means 15 is provided with two terminals A and B for changing over a pair of switches 13 and 14 similar to the switch 11 in delayed relation. More precisely, in response to the application of voltage to the terminal B of the delay relay means 15, the switches 13 and 14 are changed over from the position A to the position B with a delay time of about 4 seconds. On the other hand, in response to the application of voltage to the terminal A of the delay relay means 15, the switches 13 and 14 are changed over from the position B to the position A with a delay time of about 1 second irrespective of whether or not voltage is applied to the terminal B of the delay relay means 15. A solenoid 27 is energized only when the switches 11 and 14 are changed over to the position A to be maintained in such position for forwarding the leader tape 2'. This solenoid 27 acts to press a tape forwarding idler (not shown) against the supply reel mounting means for causing rotation of the supply reel 3 in the forwarding direction thereby forwarding the leader tape 2'.

A relay means 16 acts to close a switch 17 for 0.5 second in response to the application of voltage thereto for energizing a solenoid 18 which changes over the tape feeding mechanism of the VTR to the reproducing position. In response to the energization of the solenoid 18, a switch 24 is urged to the closed position and the solenoid 18 holds itself to maintain the tape feeding mechanism in the reproducing position. Manual switches 31, 19, 20 and 23 are provided for stopping the magnetic tape 2, fast forwarding the magnetic tape 2, rewinding the magnetic tape 2, and starting the tape reproducing operation, respectively. Solenoids 21, 22 and 18 are energized in response to the manipulation of the respective switches 19, 20 and 23. Switches 25 and 26 are provided for maintaining the respective solenoids 21 and 22 in the self-holding position.

A photo sensor means 28 acts to change over a pair of relay switches 29 and 30 to the position B from the position A when the photoelectric element 6 shown in FIG. 1 senses light emitted from the lamp 4. The photo sensor means 28 is kept substantially in the non-operative position until the switch 11 is changed over to the position B from the position A.

In operation, the switch 11 is changed over to the position A when the cartridge 1 is mounted in position in the VTR. At this time, the remaining switches are in the positions shown by the solid lines in FIG. 2. The solenoid 27 is energized through the switch 14 to transmit rotating force of a motor (not shown) to the supply reel 3 so that the leader tape 2′ is forwarded from the supply reel 3 and passes through the guide means 5 to be guided to the take-up reel 10. An automatic winding means (not shown) is provided on the take-up reel 10 so as to wind this leader tape 2′ around the take-up reel 10. The magnetic tape 2 connected to this leader tape 2′ is then successively taken up on the take-up reel 10 while being deflected inwardly relative to the guide means 5 as shown in FIG. 5. Simultaneously with the change-over of the switch 11 to the position A, voltage is applied to the terminal B of the delay relay means 15 so that the switches 13 and 14 are changed over to the position B with a delay time of about 4 seconds after the cartridge 1 has been mounted in the VTR and the tape forwarding operation has started. The tape forwarding speed is suitably selected so that the leader tape 2′ can be completely wound around the take-up reel 10 within the period of time of 4 seconds. In response to the change-over of the switch 14 to the position B, the solenoid 27 is deenergized to cease the tape forwarding operation, and at the same time, the solenoid 18 is energized through the contact B of the switch 14 so that the tape feeding mechanism of the VTR is placed in the reproducing position. The energization of the solenoid 18 causes change-over of the switch 11 to the position B again and the solenoid 18 is maintained in the energized state through the switches 13, 31, 19, 20 and 24. When the supply of power is interrupted during the reproducing operation and is then restored, the delay relay means 15 acts to change over the switch 13 to the position B again with a delay time of about 4 seconds since the switch 12 has already been changed over to the position B, but this delay time is not especially significant. In response to the change-over of the switch 13 to the position B, the switch 17 is urged to the closed position kept in such position for 0.5 second by the relay means 16 so that the solenoid 18 is energized again to automatically start to forward the magnetic tape 2 for reproduction.

Figure 4:
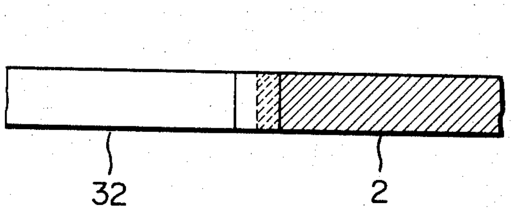
FIG. 4 is a schematic view showing a trailer tape connected to the trailing end of the magnetic tape employed in the present invention.

When the magnetic tape 2 being reproduced is completely supplied from the supply reel 3, the photoelectric element 6 senses the light passed through a transparent trailer tape 32 connected to the trailing end of the magnetic tape 2 as shown in FIG. 4, and the switch 29 is changed over to the position B by the photo sensor means 28 so that the solenoid 18 provided for forwarding the magnetic tape 2 for reproduction is deenergized, and at the same time, the solenoid 22 provided for rewinding the magnetic tape 2 is energized for automatically rewinding the magnetic tape 2.

The embodiment of the present invention above described has been arranged so that the switch 30 is changed over to the inoperative position or position B in response to the operation of the photo sensor means 28 for automatically stopping the moving magnetic tape 2 during fast forwarding of the magnetic tape 2. It will be understood however that the magnetic tape 2 being fast forwarded may be automatically rewound instead of automatically stopping the fast forwarding operation.

When the magnetic tape 2 is rewound nearly to its end, the switch 12 arranged for interlocking operation with the supply reel 3 is changed over to the position A to apply voltage to the terminal A of the delay relay means 15 and the switch 13 is opened or changed over to the position A with a delay time of about 1 second to stop the rewinding operation. This delay time of about 1 second is required for completely rewinding the magnetic tape 2 and leader tape 2′.

Detection of tape misloading in the VTR having such an arrangement will now be described. There are three kinds of misloading. Misloading of the first kind concerns with the case in which the leader tape 2′ fails to emerge out of the cartridge 1. This kind of misloading includes the case in which one forgets to connect the leader tape 2′ to the magnetic tape 2 and the case in which the leader tape 2′ is blocked at the outlet opening of the cartridge 1 and cannot emerge from within the cartridge 1. Misloading of the second kind concerns with the case in which the leader tape 2′ cannot be properly guided through the tape guide means 5 for some reason. Misloading of the third kind concerns with the case in which the leader tape 2′ cannot be properly taken up on the take-up reel 10 although it is guided to the take-up reel 10. Anyone of these three kinds of misloading can be successfully detected according to the present invention.

Detection of misloading of the first kind can be attained in a manner as described below. Normally, the leading end of the magnetic tape 2 following the leader tape 2′ ought to arrive at the take-up reel 10 in about 4 seconds after mounting of the cartridge 1 in position in the VTR. Thus, as described before, the solenoid 18 is energized with a delay time of about 4 seconds after mounting of the cartridge 1 in position in the VTR and the switch 11 is changed over to the position B to supply current to the photo sensor means 28. The switch 29 is not changed over in spite of the above situation due to the fact that the path of light from the lamp 4 to the photoelectric element 6 is intercepted by the magnetic tape 2. Consider now the case in which the leader tape 2′ fails to emerge out of the cartridge 1. In such a case, the light from the lamp 4 is sensed by the photoelectric element 6 as the photo sensor means 28 is energized in about 4 seconds after mounting of the cartridge 1 in position in the VTR, and the switch 29 is changed over to the position B so that rewinding operation is automatically started. The supply reel 3 is rotated in the reverse direction so as to rewind the same distance of the tape as that having been forwarded by the forward rotation of the reel. The switch 12 is changed over to the position A, and subsequently, the switch 13 is opened or changed over to the position A to stop the rewinding operation.

Detection of misloading of the second and third kinds can be attained in a manner as described below. In these cases, the leader tape 2' leaving the supply reel 3 cannot be forwarded any further as it is not taken up on the take-up reel 10 and no forwarding force is imparted thereto, and a portion of the leader tape 2' remains in the tape guide means 5. Therefore, a portion of the leader tape 2' lies between the lamp 4 and the photoelectric element 6 in either case. Due to the fact that the leader tape 2' has a sufficient transparency to the light, misloading of the second and third kinds can be detected in the manner entirely similar to the detection of misloading of the first kind and the magnetic tape 2 is rewound.

While an embodiment of the present invention has been described with reference to an arrangement in which the rotation of the supply reel 3 is stopped after the rewinding operation, it will be apparent to those skilled in the art that another arrangement may be easily employed in which the cartridge 1 is ejected after the tape rewinding operation. Further, the embodiment above described has been arranged so that the tape rewinding operation is started automatically as soon as the trailing end of the magnetic tape is detected during reproduction and also as soon as misloading is detected. However, it will be apparent that another arrangement may be employed in which the magnetic tape 2 is automatically rewound upon completion of reproduction and is automatically stopped upon detection of misloading. It will be further apparent that the delay means may be a mechanical one instead of the electrical one illustrated herein.

What is claimed is:

1. A magnetic recording and reproducing apparatus of the automatic tape loading type comprising a supply reel for supplying a magnetic tape of the kind in which a leader tape slightly rigider than the magnetic tape is connected to the leading end thereof and a transparent trailer tape is connected to the trailing end thereof, a take-up reel, means for guiding said leader tape portion to said take-up reel along a tape path, means disposed adjacent to the tape path for detecting the transparent tape portion connected to said magnetic tape, and delay means for energizing said detecting means substantially with a predetermined delay time after the forwarding of said leader tape portion has been started.

2. A magnetic recording and reproducing apparatus as claimed in claim 1, wherein said transparent tape portion detecting means includes a photo sensor disposed adjacent to the tape path.

3. A magnetic recording and reproducing apparatus as claimed in claim 2, wherein said leader tape is transparent.

4. A magnetic recording and reproducing apparatus as claimed in claim 2, wherein said photo sensor detects the transparent trailer tape portion connected to the trailing end of said magnetic tape at the end of the reproducing operation on said magnetic tape thereby automatically stopping or rewinding said magnetic tape.

5. A magnetic recording and reproducing apparatus as claimed in claim 1, wherein said magnetic tape is automatically stopped or rewound when said magnetic tape is not passing by the detecting element of said transparent tape portion detecting means in spite of the fact that said transparent tape portion detecting means is energized with the predetermined delay time after the forwarding of said leader tape portions has been started.

6. A magnetic recording and reproducing apparatus as claimed in claim 4, wherein the same operation as that occurred in response to the completion of the reproducing operation on said magnetic tape takes place when said magnetic tape is not passing by the detecting element of said transparent tape portion detecting means in spite of the fact that said transparent tape portion detecting means is energized with the predetermined delay time after the forwarding of said leader tape portion has been started.

7. A magnetic recording and reproducing apparatus of the automatic tape loading type comprising a supply reel for supplying a magnetic tape of the kind in which a leader tape slightly rigider than the magnetic tape is connected to the leading end thereof, a take-up reel, means for guiding said leader tape portion to said take-up reel along a tape path, and means for detecting the trailing end of said magnetic tape, said trailing end detecting means being capable also of detection of misloading of said leader tape portion.

* * * * *